United States Patent
Goetz et al.

(10) Patent No.: US 11,410,149 B1
(45) Date of Patent: Aug. 9, 2022

(54) SYSTEMS AND METHODS FOR CASH LEVELING AT SELF-CHECKOUT MACHINE

(71) Applicant: Wells Fargo Bank, N.A., San Francisco, CA (US)

(72) Inventors: Darren M. Goetz, Salinas, CA (US); Dennis E. Montenegro, Concord, CA (US); Alicia Y. Moore, San Ramon, CA (US); Timothy R. Ward, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 83 days.

(21) Appl. No.: 16/589,993

(22) Filed: Oct. 1, 2019

(51) Int. Cl.
*G06Q 20/20* (2012.01)
*G06F 17/18* (2006.01)

(52) U.S. Cl.
CPC ........... *G06Q 20/203* (2013.01); *G06F 17/18* (2013.01); *G06Q 20/202* (2013.01)

(58) Field of Classification Search
CPC ..... G06Q 20/203; G06Q 20/202; G06F 17/18
USPC ......................................................... 705/22
See application file for complete search history.

(56) References Cited

U.S. PATENT DOCUMENTS

| | | | |
|---|---|---|---|
| 5,799,288 A * | 8/1998 | Tanaka | G06Q 20/108 705/43 |
| 5,992,570 A | 11/1999 | Walter et al. | |
| 6,497,362 B2 | 12/2002 | Persky et al. | |
| 7,444,401 B1 * | 10/2008 | Keyghobad | H04L 12/2818 455/41.2 |
| 7,490,761 B2 | 2/2009 | Taylor et al. | |
| 8,019,663 B1 | 9/2011 | Bohen et al. | |
| 8,185,404 B1 | 5/2012 | McDaniel et al. | |
| 8,229,816 B1 | 7/2012 | Mattison et al. | |
| 8,444,051 B2 | 5/2013 | Votaw et al. | |
| 8,490,864 B2 | 7/2013 | Votaw et al. | |
| 8,635,134 B2 | 1/2014 | Rose et al. | |
| 8,639,594 B2 | 1/2014 | Cash | |
| 8,640,945 B1 | 2/2014 | McCormick | |
| 8,870,064 B2 | 10/2014 | Liddell et al. | |
| 9,027,830 B2 | 5/2015 | Doi et al. | |

(Continued)

FOREIGN PATENT DOCUMENTS

WO   WO-2017/056091 A1   4/2017

OTHER PUBLICATIONS

Optimization of ATM Cash Replenishment (Year: 2014).*
An integrative online ATM forecasting and replenishment model with a service level constraint, Jan. 2010 (Year: 2010).*

*Primary Examiner* — Florian M Zeender
*Assistant Examiner* — Nicole Elena Bruner
(74) *Attorney, Agent, or Firm* — Foley & Lardner LLP (57) ABSTRACT

Systems, methods, and apparatuses for maintaining a balance or level of cash stored within a plurality of terminals at a point of sale location are described herein. A provider computing system receives a pre-staging request and transaction information from a customer device. The provider computing system receives terminal information about a plurality of terminals from a point of sale computing system. The provider computing system then determines an appropriate terminal of the plurality of terminals for the customer to complete their intended transaction based on the transaction information and the terminal information, and transmits a notification indicating the appropriate terminal to the customer device.

18 Claims, 4 Drawing Sheets

(56) References Cited

U.S. PATENT DOCUMENTS

| | | | |
|---|---|---|---|
| 9,311,674 B2 | 4/2016 | Angus et al. | |
| 9,342,963 B1 | 5/2016 | McGraw, IV et al. | |
| 9,367,979 B2 | 6/2016 | Neilan | |
| 9,779,588 B2 | 10/2017 | Angus et al. | |
| 9,865,114 B2 | 1/2018 | Doi et al. | |
| 10,068,437 B2 | 9/2018 | Burdick | |
| 10,097,949 B2 | 10/2018 | Todeschini | |
| 10,192,208 B1 | 1/2019 | Catoe et al. | |
| 10,777,047 B1* | 9/2020 | Hamchuck | G06K 9/00671 |
| 2008/0230600 A1* | 9/2008 | Black | G06Q 20/20 |
| | | | 235/380 |
| 2011/0191243 A1 | 8/2011 | Allen | |
| 2014/0046831 A1 | 2/2014 | Sandler | |
| 2014/0089404 A1* | 3/2014 | Sanches | H04L 65/1093 |
| | | | 709/204 |
| 2014/0102849 A1 | 4/2014 | Li | |
| 2014/0244160 A1* | 8/2014 | Cragun | G01C 21/3679 |
| | | | 701/436 |
| 2014/0315159 A1* | 10/2014 | Mukherjee | G06F 3/167 |
| | | | 434/107 |
| 2015/0178664 A1 | 6/2015 | Neilan | |
| 2016/0063477 A1* | 3/2016 | Egan | G07G 1/0027 |
| | | | 455/406 |
| 2017/0278103 A1* | 9/2017 | Cheong | G06Q 20/3821 |
| 2017/0308835 A1* | 10/2017 | Diao | G07F 19/209 |
| 2018/0097910 A1* | 4/2018 | D'Agostino | H04L 67/32 |
| 2018/0198641 A1* | 7/2018 | Gilani | H04L 63/1425 |
| 2018/0204424 A1 | 7/2018 | Licht et al. | |
| 2018/0240095 A1 | 8/2018 | Buckley et al. | |
| 2018/0247479 A1 | 8/2018 | Yamashita et al. | |
| 2018/0308077 A1 | 10/2018 | Koeppel et al. | |
| 2019/0005474 A1 | 1/2019 | Cady et al. | |
| 2019/0034842 A1 | 1/2019 | Cash | |
| 2020/0356979 A1* | 11/2020 | Dadhaniya | G06Q 20/3223 |

\* cited by examiner

SYSTEMS AND METHODS FOR CASH LEVELING AT SELF-CHECKOUT MACHINE

TECHNICAL FIELD

The present application relates to cash leveling between terminals configured to receive, store, and dispense cash. More particularly, the present application relates to systems and methods for cash leveling between assisted and self-checkout terminals at a point of sale location.

BACKGROUND

Various retailer and service provider locations utilize terminals to perform cash transactions. For example, assisted terminals (i.e., terminals operated by workers) and self-checkout terminals (i.e., terminals operated by customers) are common within retailer and service provider locations to allow for customers to make various purchases. In some instances, customers may desire to also make a cash withdrawal (i.e., receive cash back) after making a purchase at a terminal. Maintaining appropriate cash amounts within a plurality of terminals at a retailer or service provider location places a burden on the retailer or service provider associated with transporting cash to and from various locations to replace and/or remove cash from various terminals. For example, some terminals may need to be serviced (i.e., have money replaced or removed) by a point of sale employee or other financial service provider a few times a week to once a day, or even more often in some cases. Further, aside from the cost of transporting cash, as interest rates have continued to rise, it has become more expensive to hold cash within terminals.

SUMMARY

One example embodiment relates to a method for directing a customer to an appropriate terminal to complete an intended transaction. The method comprises receiving, by a provider computing system, a pre-staging request from a customer device. The method further comprises receiving, by the provider computing system, transaction information from the customer device. The method further comprises receiving, by the provider computing system, a current cash amount from each of a plurality of terminals of a point of sale computing system. The method further comprises determining, by the provider computing system, an estimated cash flow for each of the plurality of terminals. The method further comprises determining, by the provider computing system, an appropriate terminal of the plurality of terminals for the customer to complete the intended transaction based on the transaction information, the current cash amount, and the estimated cash flow. The method further comprises transmitting, by the provider computing system, a notification indicating the appropriate terminal to the customer device.

Another example embodiment relates to a method for directing a customer to an appropriate terminal to complete an intended transaction. The method comprises receiving, by a provider computing system, a pre-staging request from a customer device. The method further comprises receiving, by the provider computing system, transaction information from the customer device. The method further comprises receiving, by the provider computing system, terminal information about a plurality of terminals from a point of sale computing system. The method further comprises determining, by the provider computing system, an appropriate terminal of the plurality of terminals for the customer to complete the intended transaction based on the transaction information and the terminal information. The method further comprises transmitting, by the provider computing system, a notification indicating the appropriate terminal to the customer device.

Another example embodiment relates to a provider computing system associated with a provider. The provider computing system comprises a network interface and a processing circuit. The network interface is structured to facilitate data communication via a network. The processing circuit comprises a processor and memory. The processing circuit is structured to receive a pre-staging request from a customer device via the network. The processing circuit is further structured to receive transaction information from the customer device via the network. The processing circuit is further structured to receive a current cash amount from a plurality of terminals of a point of sale computing system via the network. The processing circuit is further structured to determine an estimated cash flow for each of the plurality of terminals. The processing circuit is further structured to determine an appropriate terminal of the plurality of terminals for the customer to complete the intended transaction. The processing circuit is further structured to transmit a notification indicating the appropriate terminal to the customer device via the network.

These and other features, together with the organization and manner of operation thereof, will become apparent from the following detailed description when taken in conjunction with the accompanying drawings.

DETAILED DESCRIPTION

Referring generally to the figures, systems and methods for maintaining a balance or level of cash stored within a plurality of terminals at a point of sale location (e.g., a retailer or service provider location) are shown and described. The systems and methods described herein achieve this balancing or leveling of cash by allowing a customer to pre-stage an intended transaction and subsequently providing the customer with an indication of an appropriate terminal that is both capable of handling the customer's intended transaction and suited to maintain the balance or level of cash within each of the plurality of terminals at a point of sale location.

For example, a customer may approach a terminal area at the point of sale location and use their mobile phone or other personal device to request to pre-stage their transaction using a customer client application. By pre-staging their transaction, the customer may provide an indication of an estimated transaction amount and a desired cash withdrawal amount to a provider computing system. The provider computing system may then determine an appropriate terminal for the customer's transaction based on the transaction information and terminal information associated with each of the plurality of terminals. The provider computing system may then send a notification to the customer's mobile phone or other personal device indicating the appropriate terminal for their intended transaction.

The embodiments of the terminal cash balancing system described herein improve current computing systems and payment systems by performing certain steps that cannot be done by conventional computing systems or human actors. For example, the terminal cash balancing system ensures a balanced flow of cash to and/or from a plurality of terminals at a point of sale location, thereby minimizing a need for cash replacement and/or removal to and/or from the plurality of terminals. Accordingly, costs associated with cash replacement and/or removal are minimized. Additionally, using current systems, a customer performing a transaction at a terminal may be limited in the amount of cash back they can receive during the transaction due to the terminal not having enough stored cash. Accordingly, by allowing the customer to pre-stage an intended transaction, the customer may be directed to a terminal that they know will be capable of handling the intended transaction, thereby avoiding a situation wherein the customer is unnecessarily limited.

As used herein, "cash" refers to currency in the form of physical money including, for example, paper money and/or coins.

Figure 1:
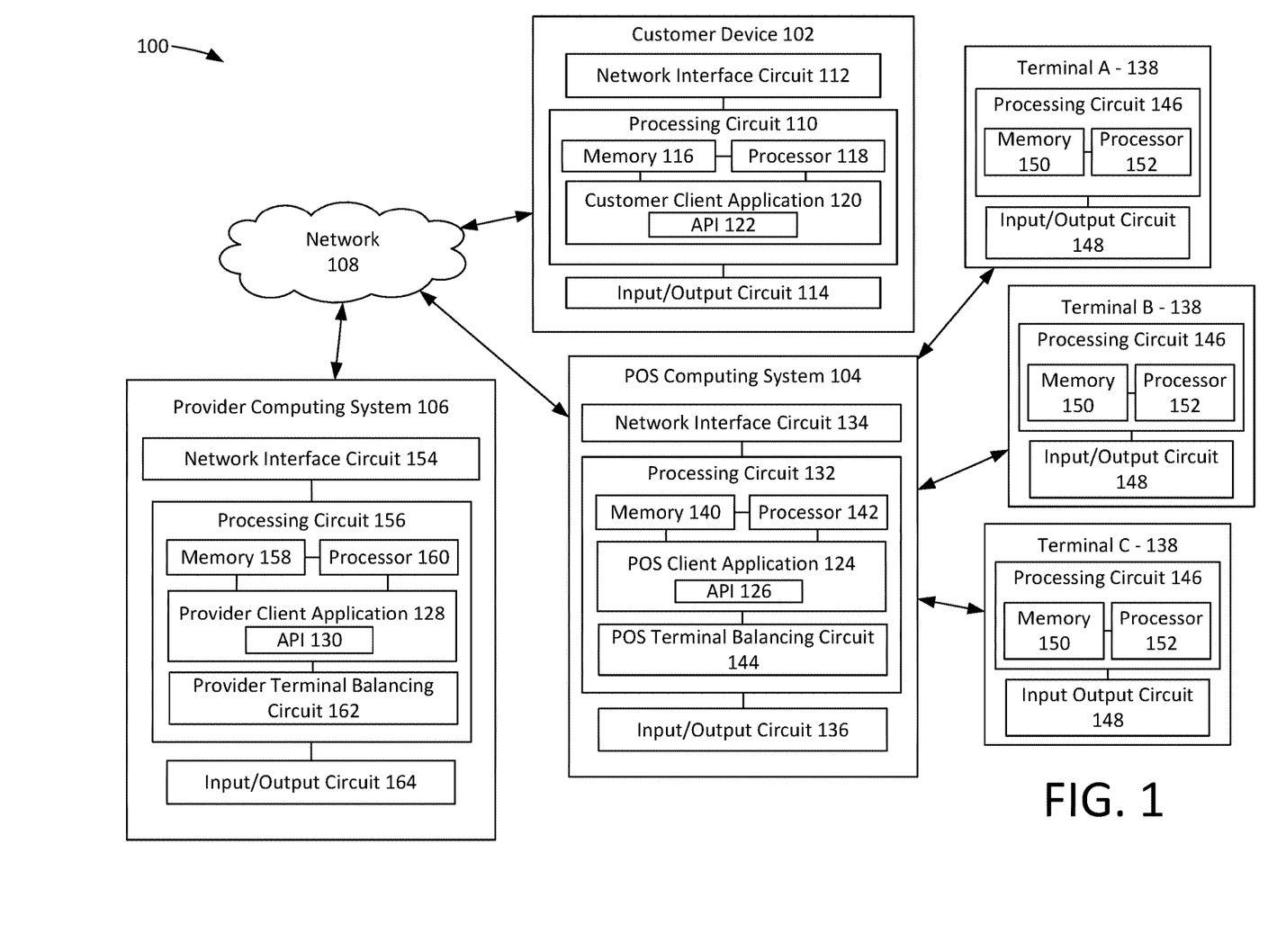
FIG. 1 is a diagram of a terminal cash balancing system according to an example embodiment.

FIG. 1 is a block diagram of a terminal cash balancing system 100 for providing a customer with an indication of an appropriate terminal that is both capable of handling the customer's intended transaction and most suited to maintain a balance of cash within each of a plurality of terminals at a point of sale location. The system 100 further allows for the appropriate terminal to be selected based on both the customer's transaction information and the terminal information from each of the plurality of terminals.

The system 100 includes a customer device 102, a point of sale (POS) computing system 104, and a provider computing system 106. The customer device 102, the POS computing system 104, and the provider computing system 106 are in communication with each other and connected by a network 108. The customer device 102 may be any suitable user computing device. For example, the customer device 102 may be a mobile phone, a personal computer (e.g., a desktop computer or a laptop computer), a tablet, a smart watch or other wearable device, or any other suitable user computing device capable of accessing and communicating using local and/or global networks.

The customer device 102 includes a processing circuit 110, a network interface circuit 112, and an input/output circuit 114. The processing circuit 110 includes a memory 116, a processor 118, and a customer client application 120. The memory 116 includes one or more memory devices (e.g., RAM, NVRAM, ROM, Flash Memory, hard disk storage, etc.) that store data and/or computer code for facilitating the various processes described herein. That is, in operation and use, the memory 116 stores at least portions of instructions and data for execution by the processor 118 to control the functionality of the processing circuit 110. Moreover, the memory 116 may be or include tangible, non-transient volatile memory or non-volatile memory. The processor 118 may be implemented as a general-purpose processor, an application specific integrated circuit (ASIC), one or more field programmable gate arrays (FPGAs), a digital signal processor (DSP), a group of processing components, or other suitable electronic processing components.

As such, the customer device 102 is configured to run a variety of application programs and store associated data in a database of the memory 116. One such application may be the customer client application 120.

The customer client application 120 is structured to provide displays to the customer device 102 that enable the customer to manage interactions with the various elements of the terminal cash balancing system 100 to pre-stage an intended transaction at a point of sale and to receive an indication of an appropriate terminal to use for the intended transaction. Accordingly, the customer client application 120 is communicably coupled to the POS computing system 104 (e.g., a POS terminal balancing circuit 144) and/or to the provider computing system 106 (e.g., a provider terminal balancing circuit 162). In some embodiments, the customer client application 120 may be incorporated with an existing application in use by the customer device 102 (e.g., a provider client application 128, a mobile banking application, a service provider application, a retail company application, etc.). In other embodiments, the customer client application 120 is a separate software application implemented on the customer device 102. The customer client application 120 may be downloaded by the customer device 102 prior to its usage, hard coded into the memory 116 of the customer device 102, or be a web-based interface application such that the customer device 102 may provide a web browser to the application, which may be executed remotely from the customer device 102.

In the latter instance, the customer or user may have to log onto or access the web-based interface before usage of the application. Further, and in this regard, the customer client application 120 may be supported by a separate computing system including one or more servers, processors, network interface circuits, etc. that transmit applications for use to the customer device 102. In certain embodiments, the customer client application 120 includes an application programming interface (API) and/or a software development kit (SDK) that facilitate the integration of other applications with the customer client application 120. For example, the customer client application 120 may include an API 122 that facilitates the receipt and/or transmittal of information pertaining to the terminal cash balancing system 100 as described further below.

In some embodiments, the customer client application 120 may be configured to utilize the functionality of the POS computing system 104 by interacting with a POS client application 124 through a POS API 126 and/or the provider computing system 106 by interacting with a provider client application 128 through a provider API 130. Accordingly, the customer client application 120 may be communicably coupled with the POS computing system 104 and the provider computing system 106 to allow the customer to pre-stage an intended transaction at a point of sale (e.g., a retailer, a service provider location, etc.). The customer client application 120 is further structured to receive a notification indicating an appropriate terminal 138 determined to be capable of handling the user's intended transaction. The customer client application 120 is further structured to display the notification to the customer.

The customer client application 120 is a network-based or web application. Accordingly, the customer device 102 includes software and/or hardware capable of implementing a network-based or web application. Further, the customer client application 120 includes software such as HTML, XML, WML, SGML, PHP (Hypertext Preprocessor), CGI, and like languages.

The displays presented to the user via the customer client application 120 may provide a prompt to the customer to submit transaction information to the system 100. For example, in some arrangements, the customer client application 120 may prompt the customer to provide a store location, an estimated transaction amount (i.e., an estimated total cost of a purchase to be made by the customer), a desired cash withdrawal amount. In some instances, the store (e.g., retailer, service provider location, etc.) associated with the POS computing system 104 and/or the provider associated with the provider computing system 106 may set a limit on the amount of cash that can be withdrawn from a terminal 138 during a transaction (e.g. sixty dollars, one hundred dollars, etc.). Accordingly, in some instances, the customer client application 120 may not permit withdraw requests above the limit set by the store and/or provider. The displays presented to the user via the customer client application 120 may then provide a notification indicating a suitable terminal 138 for completing the desired transaction and withdrawal.

The network interface circuit 112 is used to establish connections with other computing systems by way of the network 108. The network interface circuit 112 includes program logic that facilitates connection of the customer device 102 to the network 108. For example, the network interface circuit 112 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 112 includes the hardware and machine-readable media sufficient to support communication over multiple channels of data communication. Further, in some arrangements, the network interface circuit 112 includes cryptography capabilities to establish a secure or relatively secure communication session in which data communicated over the session is encrypted.

To provide the functions of the customer device 102, the network interface circuit 112 provides a relatively high-speed link to the network 108, which may be any combination of a local area network (LAN), an intranet (e.g., a private banking or retailer network), the Internet, or any other suitable communications network, either directly or through another external interface.

The input/output circuit 114 is structured to receive communications from and provide communications to the customer associated with the customer device 102. In this regard, the input/output circuit 114 is structured to exchange data, communications, instructions, etc. with an input/output component of the customer device 102. Accordingly, in one embodiment, the input/output circuit 114 includes an input/output device. In another embodiment, the input/output circuit 114 includes communication circuitry for facilitating the exchange of data, values, messages, and the like between an input/output device and the components of the customer device 102. In yet another embodiment, the input/output circuit 114 includes machine-readable media for facilitating the exchange of information between an input/output device and the components of the customer device 102. In still another embodiment, the input/output circuit 114 includes any combination of hardware components, communication circuitry, and machine-readable media.

For example, in some embodiments, the input/output circuit 114 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 114 provides an interface for the user to interact with various applications (e.g., the customer client application 120) stored on the customer device 102.

The POS computing system 104 may similarly include a processing circuit 132, a network interface circuit 134, and an input/output circuit 136, and is further communicably coupled to a plurality of terminals 138. The processing circuit 132, the network interface circuit 134, and the input/output circuit 136 may function substantially similar to and include the same or similar components as the processing circuit 110, the network interface circuit 112, and the input/output circuit 114 described above, with reference to the customer device 102. Accordingly, it will be understood that the description of the processing circuit 110, the network interface circuit 112, and the input/output circuit 114 provided above may be applied to the processing circuit 132, the network interface circuit 134, and the input/output circuit 136 of the POS computing system 104.

For example, the processing circuit 132 includes a memory 140, a processor 142, the POS client application 124, and the POS terminal balancing circuit 144. The memory 140 and the processor 142 are substantially similar to the memory 116 and the processor 118 described above. As such, the POS computing system 104 is configured to run a variety of application programs and store associated data in a database of the memory 140. One such application may be the POS client application 124.

The POS client application 124 is structured to provide displays to the POS computing system 104 that enable a user or POS employee to manage interactions with the various elements of the terminal cash balancing system 100 to, among other things, determine an appropriate terminal for an intended transaction of a customer, transmit an indication of the appropriate terminal to the customer device 102, and/or to dispatch a POS employee or other financial provider to remove cash or provide additional cash to a terminal 138, as necessary. Accordingly, the POS client application 124 is communicably coupled to the customer device 102 (e.g., the customer client application 120) and/or the provider computing system 106 (e.g., a provider client application 128).

In some embodiments, the POS client application 124 may be incorporated with an existing application in use by the POS computing system 104 (e.g., the provider client application 128, a mobile banking application, a service provider application, etc.). In other embodiments, the POS client application 124 is a separate software application implemented on the POS computing system 104. The POS client application 124 may be downloaded by the POS computing system 104 prior to its usage, hard coded into the memory 140 of the POS computing system 104, or be a web-based interface application such that the POS computing system 104 may provide a web browser to access the application, which may be executed remotely from the POS computing system 104.

In the latter instance, the user (e.g., a POS employee) may have to log onto or access the web-based interface before usage of the application. Further, and in this regard, the POS client application 124 may be supported by a separate computing system including one or more servers, processors, network interface circuits, etc. that transmit applications for use to the POS computing system 104. In certain embodiments, the POS client application 124 includes an application programming interface (API) and/or a software development kit (SDK) that facilitate the integration of other applications with the POS client application 124. For example, the POS client application 124 may include the API 126 that facilitates the receipt and/or transmittal of information pertaining to the terminal cash balancing system 100 as described further below.

In some embodiments, the POS client application 124 is configured to utilize the functionality of the provider computing system 106 by interacting with the provider client application 128 through the API 130. Accordingly, the POS client application 124 may be communicably coupled with the customer device 102 and the provider computing system 106 to perform a variety of functions. For example, the POS client application 124 is configured to receive transaction information from the customer device 102 provided by the customer, receive information about each of the terminals 138 from each of the terminals 138, determine an appropriate terminal 138 capable of handling the customer's intended transaction, build a notification indicating the determined terminal 138, and transmit the notification to the customer device 102 for viewing by the customer. The POS client application 124 is a network-based or web application. Accordingly, the POS computing system 104 includes software and/or hardware capable of implementing a network-based or web application. The POS client application 124 includes software such as HTML, XML, WML, SGML, PHP (Hypertext Preprocessor), CGI, and like languages.

The displays presented to the user via the POS client application 124 may provide a prompt to the POS employee to submit various cash balancing preferences to the system 100. For example, in some arrangements, the POS client application 124 may prompt the POS employee to enter a minimum cash amount threshold, a maximum cash amount threshold, and a desired cash counting frequency. The minimum cash amount threshold is an amount of cash (e.g., two hundred dollars, one hundred dollars, fifty dollars, etc.) that, when an amount of cash in a terminal 138 is below the minimum cash amount threshold, indicates that the terminal 138 requires a cash refill. Likewise, the maximum cash amount threshold is an amount of cash (e.g., one thousand dollars, five hundred dollars, two hundred dollars, etc.) that, when the amount of cash in the terminal 138 is above the maximum cash amount threshold, indicates that the terminal 138 needs a cash removal. The desired cash counting frequency is a frequency with which a cash count will be performed for each terminal 138.

Although FIG. 1 shows the POS terminal balancing circuit 144 as part of the processing circuit 132, in other arrangements the POS terminal balancing circuit 144 is embodied as a separate processing circuit. Other arrangements may include more or less circuits without departing from the spirit and scope of the present disclosure. Therefore, those of ordinary skill in the art will appreciate that the present arrangement is not meant to be limiting.

The POS terminal balancing circuit 144 is communicably and operably coupled to the customer device 102 and the provider computing system 106. The POS terminal balancing circuit 144 is structured to receive the transaction information from the customer through the customer device 102. The POS terminal balancing circuit 144 is further structured to receive various data from the plurality of terminals 138. For example, the POS terminal balancing circuit 144 is configured to receive periodic or continuously-updated cash counts from each of the plurality of terminals 138. Using the periodic or continuously-updated cash counts, the POS terminal balancing circuit 144 is configured to determine an estimated cash flow for each of the plurality of terminals 138 for a given time frame. The term "cash flow" is used herein to refer to a delta or change in the amount of cash stored within the terminal 138 over a given time period or timeframe. Further, in some instances, when the terminal 138 includes a received cash storage units and a withdrawal cash storage unit, the delta or change (i.e., the "cash flow") may simply be the cash received over the given time period or the cash withdrawn over the given time period, respectively.

It will be understood that the cash flow may be positive (i.e., the cash received by the terminal 138 through various transactions is higher than the cash withdrawn from the terminal 138) or negative (i.e., the cash received by the terminal 138 through various transactions is less than the cash withdrawn from the terminal 138). For example, the POS terminal balancing circuit 144 may determine that a first terminal (shown as Terminal A) has an estimated cash flow of negative two hundred dollars on Mondays, a second terminal (shown as Terminal B) has an estimated cash flow of negative fifty dollars on Mondays, and a third terminal (shown as Terminal C) has an estimated cash flow of positive one hundred dollars on Mondays. It will be understood that differing cash flows and differing time periods may be additionally or alternatively determined.

In some embodiments, the POS terminal balancing circuit 144 is configured to build a notification when a cash count for a terminal 138 is above or below a predetermined threshold. The POS terminal balancing circuit 144 is then configured to display the notification to a POS employee or user via the input/output circuit 136 and/or transmit the notification to the provider computing system 106. Accordingly, a POS employee or other financial provider may be dispatched to remove cash or provide cash to the terminal 138, as necessary. In some instances, the notification indicating the amount of cash has risen above or fallen below the predetermined threshold may additionally or alternatively be built by the terminal 138 itself and/or the provider client application 128.

Each of the plurality of terminals 138 comprises an assisted checkout terminal (i.e., a terminal operated by a worker) or a self-checkout terminal where a customer may purchase a good or service and, in some cases, request to receive cash back after making their purchase. Accordingly, each terminal is configured to receive, store, and selectively dispense cash to a user or customer before, during, and/or after a sales transaction. Each of the terminals 138 may further be configured to recycle or not recycle the cash within the terminal 138. That is, in some embodiments, each of the terminals 138 is configured to receive cash from a user or customer, store the cash in a storage unit, and dispense cash from the same storage unit, which is potentially the same "recycled" cash that it received from the user or customer. In some other embodiments, each of the terminals 138 is configured to receive cash from a user or customer, store the cash received from the user or customer in a first storage unit (e.g., a received cash storage unit), and dispense cash from a second, separate storage unit (e.g., a withdrawal cash storage unit) that is filled or maintained by a separate cash provider (e.g., a bank, an armored vehicle servicer, a store employee, etc.).

In some embodiments, the terminals 138 are configured to communicate with the POS computing system 104 and/or the provider computing system 106 through a hardwired connect, a wireless connection, Bluetooth connectivity, Wi-Fi, or any other suitable wired or wireless communication connection. Each of the terminals 138 includes a processing circuit 146 and an input/output circuit 148 similar to the processing circuit 110 and the input/output circuit 114 described above. The processing circuit 146 of each terminal 138 similarly includes a memory 150 and a processor 152 similar to the memory 116 and the processor 118 described above.

Each of the terminals 138 is further configured to track the transactions performed by the terminal 138 and to monitor the amount of cash contained within the terminal 138. For examiner, in some instances, the processor 152 may be in communication with a bill counter (not shown) that is used to track an amount of cash received during each transaction and an amount of cash dispensed during each transaction. The processor 152 is configured to track a running total of cash contained within the terminal 138. The running total of cash is tracked by the processor 152 by first receiving or determining an initial cash amount contained within the terminal 138 and constantly updating a current cash amount based on the amount of cash received and/or dispensed. In some instances, the initial cash amount may be determined automatically by the bill counter. Each of the terminals 138 is further configured to communicate the current cash amount to the POS computing system 104 and/or the provider computing system 106.

In some instances, when the terminal 138 has a cash recycler, there may only be one current cash amount (i.e., the amount of cash within the storage unit) for each terminal 138. In some other instances, when the terminal 138 does not have a cash recycler, there may be two current cash amounts (i.e., the amount of cash within the received cash storage unit and the amount of cash within the withdrawal cash storage unit). The following description will be mainly described in the context of a terminal 138 having a single storage unit. However, it will be appreciated that the same principles may be applied to terminals 138 having two storage units.

Each of the terminals 138 is configured to store various data pertaining to the terminal 138 in the corresponding memory 150. For example, each of the terminals 138 may be configured to store data pertaining to the amount of cash contained within the terminal 138 at various time intervals, such as every hour, ever day at a predetermined time, once a week on a particular day, etc. Each of the terminals 138 may further be configured to track a number of occurrences where the amount of cash contained within the terminal 138 rises above or falls below a predetermined threshold. Each of the terminals 138 may further provide a notification to one of the POS computing system 104 and the provider computing system 106 each time that the amount of cash contained within the terminal 138 rises above or falls below the predetermined threshold. Accordingly, when a notification is provided to the POS computing system 104 or the provider computing system 106, an employee or other financial provider may be dispatched to remove cash or provide additional cash to the terminal 138, as necessary.

The provider computing system 106 may be managed by a provider, such as a credit card issuer, a bank, a retailer, a service provider, or the like. The provider computing system 106 includes a network interface circuit 154. The network interface circuit 154 is similarly used to establish connections with other computing systems by way of the network 108. The network interface circuit 154 includes program logic that facilitates connection of the provider computing system 106 to the network 108. For example, the network interface circuit 154 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 154 includes the hardware and machine-readable media sufficient to support communication over multiple channels of data communication. Further, in some arrangements, the network interface circuit 154 includes cryptography capabilities to establish a secure or relatively secure communication session in which data communicated over the session is encrypted.

The provider computing system 106 includes a processing circuit 156 having a memory 158, a processor 160, the provider client application 128, and a provider terminal balancing circuit 162. The memory 158 and the processor 160 are substantially similar to the memory 116 and the processor 118 described above, with reference to the customer device 102. As such, the provider computing system 106 is configured to run a variety of application programs and store associated data in a database of the memory 158. One such application may be the provider client application 128.

The provider client application 128 is structured to provide displays to the provider computing system 106 that enable a user or provider employee to manage interaction with the various elements of the terminal cash balancing system 100 to, among other things, determine an appropriate terminal for an intended transaction of a customer, transmit an indication of the appropriate terminal to the customer device 102 and/or the POS computing system 104, and/or to dispatch a POS employee or other financial provider to remove cash or provide additional cash to a terminal 138, as necessary. Accordingly, the provider client application 128 is communicably couple to the customer device 102 (e.g., the customer client application 120) and/or the POS computing system 104 (e.g., the POS client application 124).

In some embodiments, the provider client application 128 may be incorporated with an existing application in use by the provider computing system 106 (e.g., a mobile banking application, a service provider application, etc.). In other embodiments, the provider client application 128 is a separate software application implemented on the provider computing system 106. The provider client application 128 may be downloaded by the provider computing system 106 prior to its usage, hard coded into the memory 158 of the provider computing system 106, or be a web-based interface application such that the provider computing system 106 may provide a web browser to access the application, which may be executed remotely from the provider computing system 106.

In the latter instance, the user (e.g., a provider employee) may have to log onto or access the web-based interface before usage of the application. Further, and in this regard, the provider client application 128 may be supported by a separate computing system including one or more servers, processors, network interface circuits, etc. that transmit applications for use to the provider computing system 106. In certain embodiments, the provider client application 128 includes an application programming interface (API) and/or a software development kit (SDK) that facilitate the integration of other applications with the provider client application 128. For example, the provider client application 128 may include an API 126 that facilitates the receipt and/or transmittal of information pertaining to the terminal cash balancing system 100 as described further below.

In some embodiments, the provider client application 128 is configured to utilize the functionality of the POS computing system 104 by interacting with the POS client application 124 through the API 126. The provider client application 128 may further be communicably coupled with the customer device 102 and the POS computing system 104 to perform a variety of functions. For example, the provider client application 128 is configured to receive transaction information from the customer device 102 provided by customer, receive information about each of the terminals 138 from the POS computing system 104, determine an appropriate terminal 138 capable of handling the customer's intended transaction, build a notification indicating the determined terminal 138, and transmit the notification to the customer device 102 for viewing by the customer. The provider client application 128 is a network-based or web application. Accordingly, the provider computing system 106 includes software and/or hardware capable of implementing a network-based or web application. The provider client application 128 includes software such as HTML, XML, WML, SGML, PHP (Hypertext Preprocessor), CGI, and like languages.

The displays presented to the user via the provider client application 128 may similarly provide a prompt to the provider employee to submit various cash balancing preferences to the system 100. For example, in some arrangements, the provider client application 128 may similarly prompt the provider employee to enter a minimum cash amount threshold, a maximum cash amount threshold, and a desired cash counting frequency similar to the minimum cash amount threshold, maximum cash amount threshold, and desired cash counting frequency described above with reference to the POS client application 124.

Although FIG. 1 shows the provider terminal balancing circuit 162 as part of the processing circuit 132, in other arrangements the provider terminal balancing circuit 162 is embodied as a separate processing circuit. Other arrangements may include more or less circuits without departing from the spirit and scope of the present disclosure. Therefore, those of ordinary skill in the art will appreciate that the present arrangement is not meant to be limiting.

The provider terminal balancing circuit 162 is communicably and operably coupled to the customer device 102 and the POS computing system 104, and in some cases, each of the plurality of terminals 138. The provider terminal balancing circuit 162 is structured to receive the transaction information from the customer through the customer device 102. The provider terminal balancing circuit 162 is further structured to receive various data from the plurality of terminals 138, either through the POS computing system 104, or in some cases from each of the terminals 138 directly. For example, the provider terminal balancing circuit 162 is similarly configured to receive periodic or continuously-updated cash counts from each of the plurality of terminals 138. Using the periodic or continuously-updated cash counts, the provider terminal balancing circuit 162 is similarly configured to determine an estimated cash flow for each of the plurality of terminals 138 for a given time frame, as described above with reference to the POS terminal balancing circuit 144.

In some embodiments, the provider terminal balancing circuit 162 is similarly configured to generate a notification when a cash count for a terminal 138 is above or below a predetermined threshold. The provider terminal balancing circuit 162 is then configured to display the notification to a provider employee or user via an input/output circuit 164 and/or transmit the notification to the POS computing system 104. Accordingly, a POS employee or other financial provider may be dispatched to remove case or provide additional cash to the terminal 138, as necessary. In some instances, the notification indicating the amount of cash has risen above or fallen below the predetermined threshold may additionally or alternatively be built by the terminal 138 itself and/or the POS client application 124, as alluded to above.

The provider computing system 106 further includes the input/output circuit 164. The input/output circuit may function substantially similar to and include the same or similar components as the input/output circuit 114 described above, with reference to the customer device 102. Accordingly, it will be understood that the description of the input/output circuit 114 provided above may also be applied to the input/output circuit 164 of the provider computing system 106.

Figure 2:
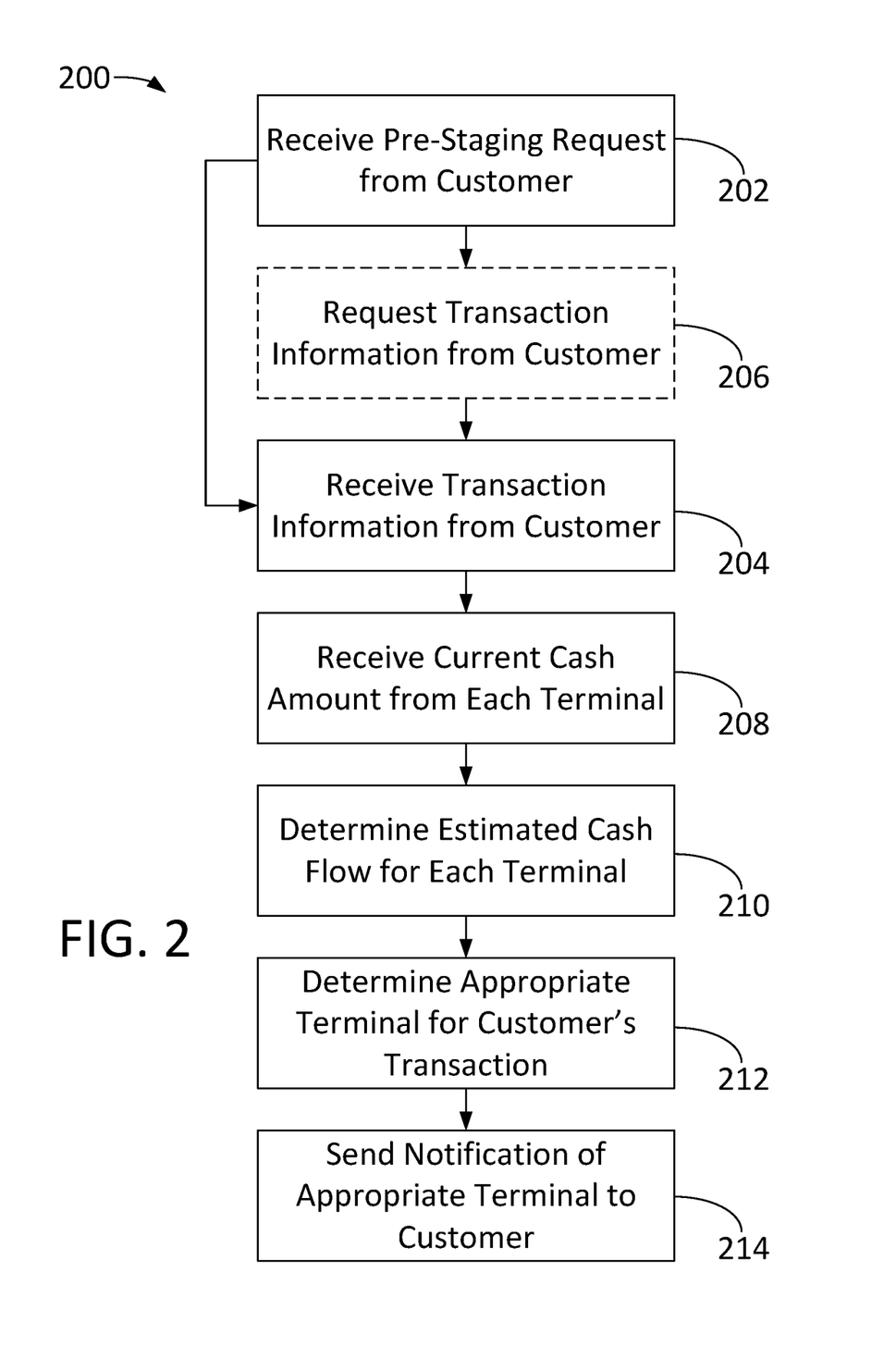
FIG. 2 is a flow diagram of a method of providing a customer with an indication of a predetermined terminal capable of handling the customer's intended transaction, according to an example embodiment.

Referring to FIG. 2, a flow diagram of a method 200 of directing a customer to an appropriate terminal is shown according to an example embodiment. The method 200 may be performed by the POS computing system 104 and/or the provider computing system 106. Through the method 200, the POS computing system 104 and/or the provider computing system 106 receives information from the customer through the customer device 102 and the plurality of terminals 138, determines an appropriate terminal 138 for a customer transaction based on the received information, and provides a notification indicating the determined terminal 138 to the customer device 102 for viewing by the customer.

The method 200 begins when a terminal interaction or pre-staging request is received from the customer device 102 (e.g., through the customer client application 120) at step 202. For example, when a customer is prepared to make a purchase at a retailer, service provider, or other point of sale location, the customer may use the input/output circuit 114 to interact with the customer client application 120 to pre-stage their transaction by entering the terminal interaction or pre-staging request. By pre-staging their intended transaction using the systems and methods described herein, the customer may be automatically directed to a terminal 138 capable of handling their intended transaction, thereby ensuring a successful customer transaction. Once the terminal interaction or pre-staging request has been entered by the customer, the customer client application 120 may then transmit the terminal interaction or pre-staging request to the POS computing system 104 and/or the provider computing system 106. The terminal interaction or pre-staging request then is received at the POS computing system 104 and/or the provider computing system 106.

Transaction information is then received from the customer device 102 at step 204. In some instances, the transaction information may be included in the terminal interaction or pre-staging request. In other instances, the transaction information may be separately provided by the customer. The transaction information is again received at either the POS computing system 104 or the provider computing system 106. The transaction information is similarly entered into the customer client application 120 and transmitted to the POS computing system 104 and/or the provider computing system 106. As alluded to above, the transaction information may include a point of sale location (e.g., a retail store location, a service provider location, etc.), an estimated transaction amount, and a desired cash withdrawal amount.

If transaction information is not initially transmitted from the customer device 102 with the terminal interaction or pre-staging request, the POS computing system 104 and/or the provider computing system 106 may request the transaction information from the customer device 102 at step 206. For example, the POS computing system 104 (e.g., the POS client application 124) and/or the provider computing system 106 (e.g., the provider client application 128) may be configured to transmit a prompt to the customer device 102 (e.g., the customer client application 120) requesting the transaction information.

In some instances, if the provider computing system 106 is performing the method 200, the transaction information received by the provider computing system 106 may further include a point of sale location. In some embodiments, the provider computing system 106 may be communicably coupled to a plurality of POS computing systems that are similar to the POS computing system 104. The provider computing system 106 may then use the store location proved by the customer to select a POS computing system 104 associated with that specific store location.

The POS computing system 104 and/or the provider computing system 106 may then receive a current cash amount from each of the terminals 138 at step 208. For example, as described above, each of the plurality of terminals 138 are configured to continuously monitor the amount of cash contained within the terminal 138. Upon receipt of the terminal interaction request and the transaction information, the POS computing system 104 (e.g., the POS terminal balancing circuit 144) and/or the provider computing system 106 (e.g., the provider terminal balancing circuit 162) may selectively request the current cash amount from each of the terminals 138. Each of the terminals 138 may then transmit the current cash amount to the POS computing system 104 and/or the provider computing system 106.

The POS computing system 104 and/or the provider computing system 106 may then determine an estimated cash flow for each terminal 138 at step 210. As described above, the POS computing system 104 (e.g., the POS terminal balancing circuit 144) and/or the provider computing system 106 (e.g., the provider terminal balancing circuit 162) may receive periodic or continually-updated cash counts from each of the plurality of terminals 138. The POS computing system 104 and/or the provider computing system 106 may store this information in the memory 140 and/or the memory 158, and use this information to determine the estimated cash flow for a given timeframe. Specifically, the POS terminal balancing circuit 144 and/or the provider terminal balancing circuit 162 may determine an average cash flow for a given terminal 138 for a given timeframe over a larger timeframe to determine the estimated cash flow for the terminal 138. For example, the POS terminal balancing circuit 144 and/or the provider terminal balancing circuit 162 may determine an average cash flow for a first terminal (shown as Terminal A) for a given timeframe (e.g., a Monday) over a larger timeframe (e.g., the last month), and use the average cash flow to determine the estimated cash flow for the first terminal during the given timeframe in the future. It will be appreciated that various mathematical methods may be used for estimating the cash flow for a particular terminal during a particular timeframe. For example, historical cash flow data tracked by the terminal 138 may be used to create probabilistic cash flow models for each terminal 138, which may be used to determine the estimated cash flow for each terminal 138 over a given time period.

Once the POS computing system 104 and/or the provider computing system 106 has received the transaction information and the current cash amount for each terminal 138, and has determined the estimated cash flow for each terminal 138, the POS computing system 104 and/or the provider computing system 106 then determines an appropriate terminal 138 for the customer's transaction at step 212. Specifically, the POS terminal balancing circuit 144 and/or the provider terminal balancing circuit 162 determines the appropriate terminal 138 based on the transaction information (e.g., the estimated transaction amount and the desired cash withdrawal amount) and the terminal information (e.g., the current cash amount and the estimated cash flow) about the plurality of terminals 138 to determine an appropriate terminal or a plurality of appropriate terminals suitable for the customer's intended transaction. In some instances, an appropriate terminal may be a terminal 138 having a sufficient amount of available storage space for additional cash within the storage unit and/or enough stored cash within the storage unit to complete the customer's transaction.

Further, in some instances, when multiple terminals 138 are capable of completing the customer's transaction, the POS terminal balancing circuit 144 and/or the provider computing system 106 may use the estimated cash flow and/or historical cash flow data for the plurality of terminals 138 to determine a terminal 138 that, if used by the customer for their transaction, would best balance the cash amount contained within all of the terminals 138. That is, the appropriate terminal 138 may be selected to minimize a frequency with which the plurality of terminals 138 need to be serviced (e.g., have cash supplied to or withdrawn from) by the POS employees or various other financial service providers. Furthermore, the appropriate terminal 138 may be selected to minimize excess cash within any one of the plurality of terminals 138, while simultaneously satisfying the projected outflow of cash from each of the terminals 138.

The POS computing system 104 and/or the provider computing system 106 then sends or transmits a notification indicating the appropriate terminal and/or terminals to the customer device 102 at step 214. The POS terminal balancing circuit 144 and/or the provider terminal balancing circuit 162 are configured to build a notification indicating the appropriate terminal and/or terminals for transmission to the customer device 102. In some embodiments, the notification may be a simple message indicating which terminals are appropriate for the customer's intended transaction. For example, the notification may instruct the customer to proceed to a first terminal (e.g., Terminal A) to complete their transaction. In some other embodiments, the notification may be a rough schematic or map illustration of the point of sale location with the appropriate terminal or terminals indicated thereon. In some other embodiments, the notification may include any other suitable indication capable of directing the customer to an appropriate terminal or terminals.

Additionally, in some instances, the estimated cash flow for each terminal 138 may be used by the POS location associated with the POS computing system 104 and/or the provider associated with the provider computing system 106 to create a cash refill/removal schedule for the plurality of terminals 138. That is, the POS terminal balancing circuit 144 and/or the provider terminal balancing circuit 162 are structured to predict when the current cash amounts for each of the plurality of terminals 138 will drop below the minimum cash amount threshold or rise above the maximum cash amount threshold. The POS computing system 104 and/or the provider computing system 106 are then structured to store and display this information to corresponding users of the POS computing system 104 and/or the provider computing system 106 to aid in the allocation of cash resources within the system 100.

Figure 3:
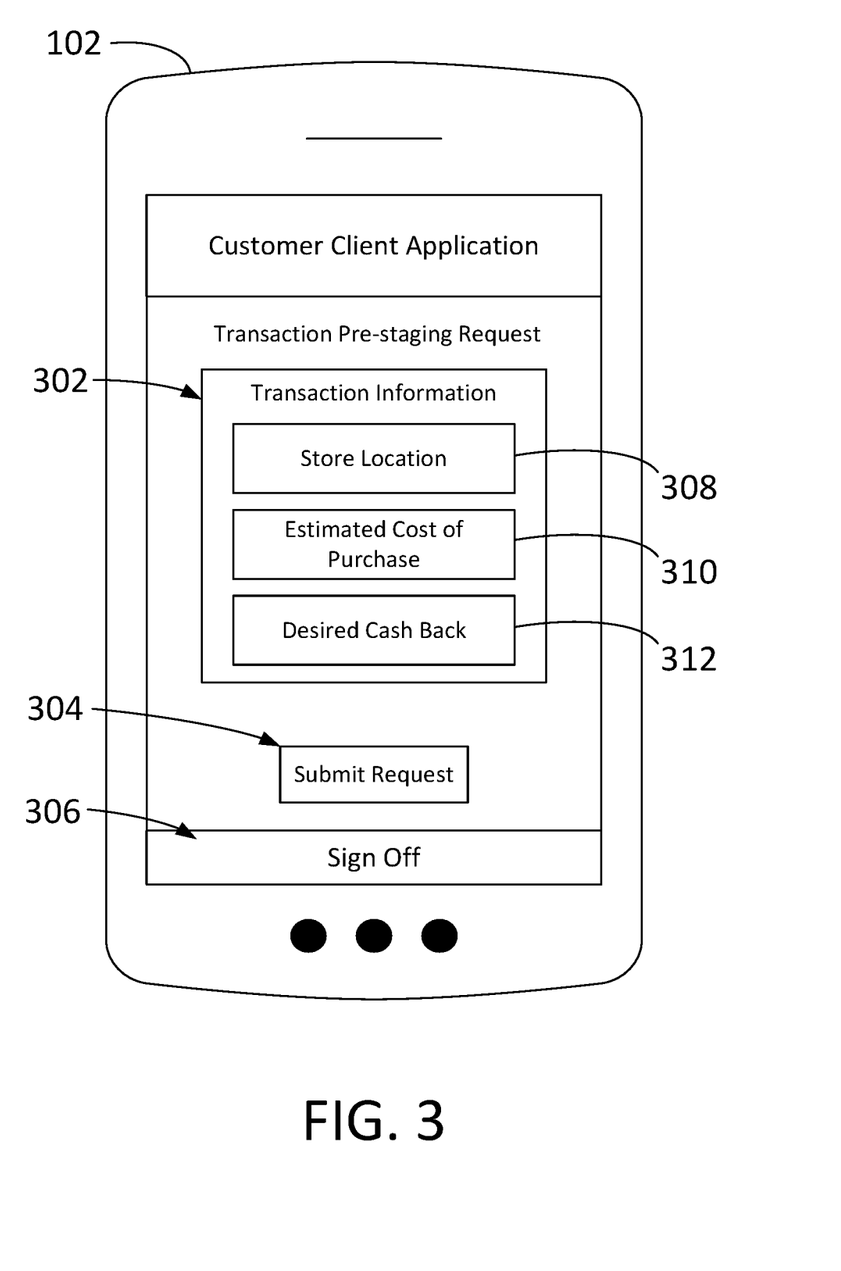
FIG. 3 is a transaction pre-staging request interface provided by a customer client application, according to an example embodiment.
Figure 4:
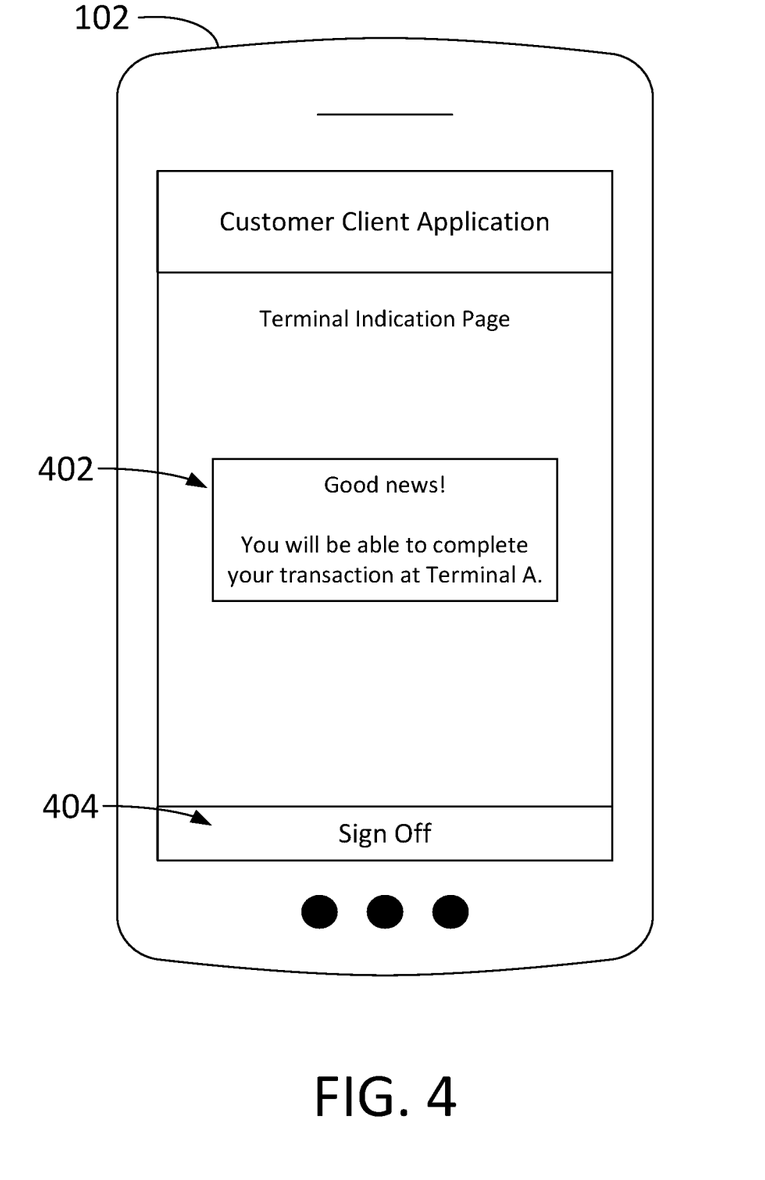
FIG. 4 is a terminal notification interface provided by a customer client application, according to an example embodiment.

Referring now to FIGS. 3 and 4, graphical user interfaces displayed on the customer device 102 via the customer client application 120 are shown, according to example embodiments. Referring now to FIG. 3, an example screenshot of a client application interface of the customer device 102 associated with a customer is shown, according to an example embodiment. The interface 300 is indicative of a transaction pre-staging request interface the customer could receive once they are logged into the customer client application 120. The interface 300 includes a transaction information field 302, a submit request field 304, and a sign off field 306. The transaction information field 302 includes a store location entry box 308, an estimated cost entry box 310, and a desired cash back entry box 312. The customer may use the store location entry box 308, the estimated cost entry box 310, and the desired cash back entry box 312 to enter the store location, estimated cost of their purchase, and their desired cash back, respectively. In some instances, when the customer taps any of the entry boxes 308, 310, 312 with their fingertip, a touchscreen keyboard may pop up on the interface 300, thereby allowing the customer to provide their inputs. Once the customer has provided the transaction information, the customer may then click on the submit request field 304 to submit their pre-staging request. If the customer wishes to sign off, they may alternatively click on the sign off field 306 to log out of the customer client application 120.

Referring now to FIG. 4, an example screenshot of a client application interface of the customer device 102 associated with a customer is shown, according to an example embodiment. The interface 400 is indicative of a terminal notification interface the customer could receive. The interface 400 includes a notification 402 and a sign off field 404. The notification 402 includes a message notifying the customer that there is a terminal capable of completing their intended transaction and directing them to the appropriate terminal (e.g., an appropriate one of the plurality of terminals 138 described herein). Once the customer has read the notification 402, they may similarly click on the sign off field 404 to log out of the customer client application 120.

Furthermore, those of skill in the art will appreciate that FIGS. 3 and 4 are meant to be illustrative, rather than limiting. For example, in other embodiments, the interfaces are configured differently, such as including different entry boxes, different notifications, a different order, a different arrangement, or different options generally. As another example, in other embodiments, the notification 402 additionally or alternatively includes a rough schematic or map illustration of the store with the appropriate terminal or terminals indicated thereon, as described above.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally, or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method for directing a customer to an appropriate terminal to complete an intended transaction, the method comprising:
   receiving, by a provider computing system, a pre-staging request from a customer device;
   receiving, by the provider computing system, transaction information from the customer device, the transaction information including an estimated transaction amount, a desired cash back amount, and a point of sale location, the estimated transaction amount being an estimated total cost of a purchase to be made by the customer;
   selecting, by the provider computing system, a point of sale computing system from a plurality of point of sale computing systems based on the point of sale location;
   receiving, by the provider computing system, a current cash amount from each of a plurality of terminals of the point of sale computing system;
   determining, by the provider computing system, an estimated cash flow for each of the plurality of terminals, the estimated cash flow being an estimated change in an amount of cash stored within each of the plurality of terminals over a time period;
   prompting, by the provider computing system, an employee to enter cash balancing preferences, the cash balancing preferences including a minimum cash amount threshold, a maximum cash amount threshold, and a desired cash counting frequency;
   receiving, by the provider computing system, the cash balancing preferences from the employee;
   determining, by the provider computing system, the appropriate terminal of the plurality of terminals for the customer to complete the intended transaction based on the transaction information, the current cash amount, the estimated cash flow, and the cash balancing preferences;
   generating, by the provider computing system, a user interface including a map illustration of the point of sale location indicating the appropriate terminal; and
   transmitting, by the provider computing system, the user interface to the customer device.

2. The method of claim 1, wherein the estimated cash flow is determined based on an average cash flow for a given timeframe.

3. The method of claim 1, wherein the estimated cash flow is based on probabilistic cash flow models created using historical cash flow data.

4. The method of claim 1, wherein the appropriate terminal is determined to minimize a frequency with which the plurality of terminals need to be serviced.

5. The method of claim 1, further comprising:
   creating, by the provider computing system, one of a cash refill schedule or a cash removal schedule based on the estimated cash flow for each of the plurality of terminals.

6. The method of claim 5, wherein the one of the cash refill schedule or the cash removal schedule is created based on a prediction of when the current cash amount for each of the plurality of terminals will one of drop below the minimum cash amount threshold or rise above the maximum cash amount threshold.

7. A method for directing a customer to an appropriate terminal to complete an intended transaction, the method comprising:
   receiving, by a provider computing system, a pre-staging request from a customer device;
   receiving, by the provider computing system, transaction information from the customer device, the transaction information including an estimated transaction amount, a desired cash back amount, and a point of sale location, the estimated transaction amount being an estimated total cost of a purchase to be made by the customer;
   selecting, by the provider computing system, a point of sale computing system from a plurality of point of sale computing systems based on the point of sale location;
   receiving, by the provider computing system, terminal information about a plurality of terminals from the point of sale computing system;
   determining, by the provider computing system, an estimated cash flow for each of the plurality of terminals, the estimated cash flow being an estimated change in an amount of cash stored within each of the plurality of terminals over a time period;

prompting, by the provider computing system, an employee to enter cash balancing preferences, the cash balancing preferences including a minimum cash amount threshold, a maximum cash amount threshold, and a desired cash counting frequency;

receiving, by the provider computing system, the cash balancing preferences from the employee;

determining, by the provider computing system, the appropriate terminal of the plurality of terminals for the customer to complete the intended transaction based on the transaction information, the estimated cash flow, the terminal information, and the cash balancing preferences;

generating, by the provider computing system, a user interface including a map illustration of the point of sale location indicating the appropriate terminal; and transmitting, by the provider computing system, the user interface to the customer device.

8. The method of claim 7, wherein the terminal information comprises a current cash amount from each of the plurality of terminals.

9. The method of claim 8, wherein the estimated cash flow is determined based on an average cash flow for a given timeframe.

10. The method of claim 8, wherein the estimated cash flow is based on probabilistic cash flow models created using historical cash flow data.

11. The method of claim 8, wherein the appropriate terminal is determined to minimize a frequency with which the plurality of terminals need to be serviced.

12. The method of claim 8, further comprising:

creating, by the provider computing system, one of a cash refill schedule or a cash removal schedule based on the estimated cash flow for each of the plurality of terminals.

13. The method of claim 12, wherein the one of the cash refill schedule or the cash removal schedule is created based on a prediction of when the current cash amount for each of the plurality of terminals will one of drop below the minimum cash amount threshold or rise above the maximum cash amount threshold.

14. A provider computing system associated with a provider comprising:

a network interface structured to facilitate data communication via a network;

a processing circuit comprising a processor and memory, the processing circuit structured to:

receive a pre-staging request from a customer device via the network;

receive transaction information from the customer device via the network, the transaction information including an estimated transaction amount, a desired cash back amount, and a point of sale location, the estimated transaction amount being an estimated total cost of a purchase to be made by a customer;

select a point of sale computing system from a plurality of point of sale computing systems based on the point of sale location;

receive a current cash amount from a plurality of terminals of the point of sale computing system via the network;

determine an estimated cash flow for each of the plurality of terminals, the estimated cash flow being an estimated change in an amount of cash stored within each of the plurality of terminals over a time period;

prompt an employee to enter cash balancing preferences, the cash balancing preferences including a minimum cash amount threshold, a maximum cash amount threshold, and a desired cash counting frequency;

receive the cash balancing preferences from the employee;

determine an appropriate terminal of the plurality of terminals for the customer to complete an intended transaction based on the transaction information, the current cash amount, the estimated cash flow, and the cash balancing preferences;

generate a user interface including a map illustration of the point of sale location indicating the appropriate terminal; and transmit the user interface to the customer device via the network.

15. The provider computing system of claim 14, wherein the estimated cash flow is determined based on an average cash flow for a given timeframe.

16. The provider computing system of claim 14, wherein the appropriate terminal is determined to minimize a frequency with which the plurality of terminals need to be serviced.

17. The provider computing system of claim 14, wherein the processing circuit is further structured to:

create one of a cash refill schedule or a cash removal schedule based on the estimated cash flow for each of the plurality of terminals.

18. The provider computing system of claim 17, wherein the one of the cash refill schedule or the cash removal schedule is created based on a prediction of when the current cash amount for each of the plurality of terminals will one of drop below the minimum cash amount threshold or rise above the maximum cash amount threshold.

* * * * *